(12) United States Patent
Bauhahn

(10) Patent No.: US 7,239,229 B2
(45) Date of Patent: Jul. 3, 2007

(54) EFFICIENT PROTOCOL FOR READING RFID TAGS

(75) Inventor: Paul E. Bauhahn, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 437 days.

(21) Appl. No.: 10/235,577

(22) Filed: Sep. 5, 2002

(65) Prior Publication Data

US 2004/0046644 A1   Mar. 11, 2004

(51) Int. Cl.
H04Q 5/22 (2006.01)
(52) U.S. Cl. ............... 340/10.42; 340/10.4; 340/10.51
(58) Field of Classification Search ............ 340/10.42, 340/10.2, 572.1, 10.32, 10.4, 10.51; 375/219; 342/44

See application file for complete search history.

(56) References Cited

U.S. PATENT DOCUMENTS

| | | | |
|---|---|---|---|
| 5,029,183 A * | 7/1991 | Tymes | ......................... 375/141 |
| 5,151,684 A | 9/1992 | Johnsen | |
| 5,305,199 A | 4/1994 | LoBiondo et al. | |
| 5,319,544 A | 6/1994 | Schmerer et al. | |
| 5,469,142 A | 11/1995 | Bergman et al. | |
| 5,533,079 A | 7/1996 | Colburn et al. | |
| 5,671,362 A | 9/1997 | Cowe et al. | |
| 5,673,037 A * | 9/1997 | Cesar et al. | ............. 340/10.32 |
| 5,686,902 A * | 11/1997 | Reis et al. | ................. 340/10.2 |
| 5,741,985 A | 4/1998 | Gaete | |
| 5,777,884 A | 7/1998 | Belka et al. | |
| 5,781,004 A | 7/1998 | Gaete | |
| 5,841,770 A | 11/1998 | Snodgrass et al. | |
| 5,949,335 A | 9/1999 | Maynard | |
| 5,962,834 A | 10/1999 | Markman | |
| 6,034,603 A | 3/2000 | Steeves | |
| 6,050,490 A | 4/2000 | Leichner et al. | |
| 6,078,251 A | 6/2000 | Landt et al. | |
| 6,091,319 A | 7/2000 | Black et al. | |
| 6,107,910 A | 8/2000 | Nysen | |
| 6,150,948 A | 11/2000 | Watkins | |
| 6,177,858 B1 * | 1/2001 | Raimbault et al. | ......... 340/10.1 |
| 6,265,963 B1 | 7/2001 | Wood, Jr. | |
| 6,289,209 B1 * | 9/2001 | Wood, Jr. | ................. 455/277.1 |
| 6,317,028 B1 | 11/2001 | Valiulis | |
| 6,330,971 B1 | 12/2001 | Mabry et al. | |
| 6,337,634 B1 | 1/2002 | O'Toole et al. | |
| 6,351,630 B2 | 2/2002 | Wood, Jr. | |
| 6,353,406 B1 | 3/2002 | Lanzl et al. | |
| 6,362,737 B1 * | 3/2002 | Rodgers et al. | .......... 340/572.1 |
| 6,483,426 B1 | 11/2002 | Pagnol et al. | |

FOREIGN PATENT DOCUMENTS

| | | |
|---|---|---|
| EP | 1 093 075 A1 | 4/2001 |
| WO | WO 99/17230 | 4/1999 |
| WO | WO 99/30286 | 6/1999 |
| WO | WO 99/45761 | 9/1999 |

* cited by examiner

*Primary Examiner*—Brian Zimmerman
*Assistant Examiner*—Clara Yang
(74) *Attorney, Agent, or Firm*—Andrew A. Abeyta, Esq.; Armstrong Teasdale LLP

(57) ABSTRACT

An RFID tag has an N data element tag identifier that uniquely identifies the RFID tag. The RFID tag selects M data elements of the tag identifier, where M<N, and transmits only the selected M data elements to a tag reader so as to identify the RFID tag to the tag reader.

32 Claims, 4 Drawing Sheets

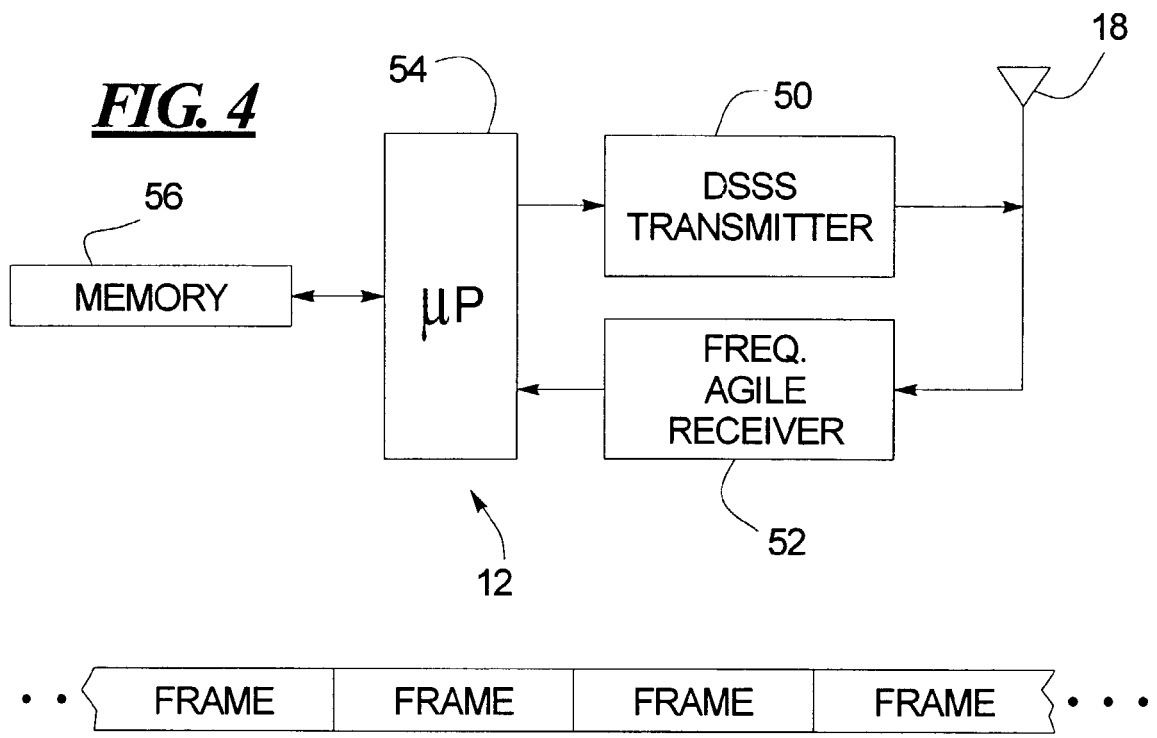
FIG. 4
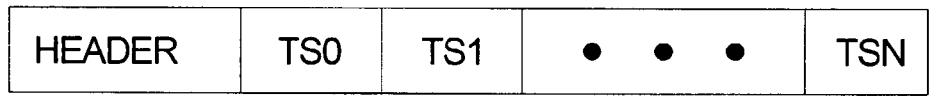
FIG. 5
FIG. 6
FIG. 7
FIG. 8
FIG. 9

EFFICIENT PROTOCOL FOR READING RFID TAGS

TECHNICAL FIELD OF THE INVENTION

The present invention relates to an apparatus and method for the efficient reading of RFID tags.

BACKGROUND OF THE INVENTION

Various labels have been attached to articles so that the articles can be distinguished one from the other. For example, bar code labels are attached to articles of grocery and are scanned at a check-out counter in order to automatically identify the articles and to register the price of the articles as they are purchased.

Bar code labels have also been used in inventory control and monitoring. Accordingly, these bar codes may be scanned in order to track articles as they move into, through, and out of a storage area. It is also known to read the bar codes attached to articles in order to access various computer records regarding the articles.

Bar code labels, however, have several drawbacks. For example, computer stored records that are accessed when a bar code is read do not move with the corresponding article. Therefore, if the article to which the bar code label is attached is remote from the computer, the records concerning that article cannot be immediately accessed if necessary.

Moreover, bar code labels cannot be read remotely. Thus, if it is desired to take an inventory of articles currently in the storage area, personnel must physically scan each label on each article one at a time in order to determine which articles are presently in the storage area. Such scanning requires the physical presence of the personnel at the location of the articles and is extremely time consuming. Additionally, because bar code labels cannot be read remotely, they cannot be used as security devices that can be detected if the articles to which they are attached are improperly removed from a secured area.

Instead of bar coded labels, it is known to attach radio frequency identification (RFID) tags to the articles to be monitored. As in the case of bar code labels, the RFID tags contain unique identification codes so that the articles to which they are attached can be distinguished from one another. However, unlike bar code labels, reading RFID tags does not require the physical presence of personnel because the RFID tags can instead be read remotely. Thus, inventory can be taken more quickly because personnel are not required to walk around a storage area or other area in order to read the RFID tags. Moreover, because RFID tags can be read remotely, they can be used as security devices. Thus, if someone attempts to surreptitiously remove an article to which an RFID tag is attached from a secured area, a remote reader can sense the RFID tag and provide an appropriate alarm. Furthermore, it is also possible to provide an RFID tag with memory. Therefore, any records concerning the article to which the RFID tag is attached can be maintained on the RFID tag rather than in a remotely located computer.

These advantages of RFID tags make their use quite attractive. However, care must be exercised in using such RFID tags because the interrogation of RFID tags for their identification codes so that their corresponding articles can be identified can consume a substantial amount of transmission time and processing power.

Generally, two techniques have been used to read the identification codes of RFID tags. In one technique, any RFID tags within the transmission range of the tag reader respond at random to an interrogation from the reader. When there are a large number of RFID tags in the receiving vicinity of the tag reader, contention may be high so that repeated interrogations may be required to read all RFID tags. Therefore, this technique works well only when there is a small number of RFID tags to be read, and is very inefficient when there is a large number of RFID tags to be read.

In the other technique, the RFID tags respond to an interrogation in a predetermined fashion using a static selection criterion to avoid contention. This approach is more effective for systems having a large number of RFID tags, but requires the transmission of substantial amounts of data from the RFID tags to the tag reader.

These problems are exacerbated because the identification codes used on RFID tags are usually quite long. For example, long identification codes are frequently required where a great many RFID tags may be used in buildings or storage areas that are close enough in proximity for a tag reader in one building or storage area to inadvertently read the RFID tags in a nearby building or storage area. In this example, the identification codes must of necessity be quite long so that the RFID tags in the proximate buildings or storage areas are uniquely identified. As another example, the number of articles stored in a single location may be sufficiently large to warrant a long identification code. Because long identification codes are generally required, the amount of time required for the RFID tags to transmit their identification codes to the tag reader, and the amount of time required for the tag reader to process these identification codes upon reception are commensurately large.

The present invention overcomes one or more of these or other problems.

SUMMARY OF THE INVENTION

In accordance with one aspect of the present invention, a method is provided to communicate an identifier from an RFID tag to a tag reader. The identifier includes N data elements. The method comprises the following: selecting M data elements of the identifier, wherein M<N; and, transmitting only the selected M data elements from the RFID tag to the tag reader so as to identify the RFID tag to the tag reader.

In accordance with another aspect of the present invention, a method of identifying an RFID tag comprises the following: transmitting a signal from a tag reader to the RFID tag, wherein the RFID tag has an identifier comprising N data elements; receiving only M of the N data elements from the RFID tag, wherein M<N; and, identifying the RFID tag from only the M data elements.

In accordance with still another aspect of the present invention, an RFID tag uniquely identified by an N data element tag identifier comprises a transmitter, a receiver, and a memory. The transmitter transmits M data elements so as to identify the RFID tag, the M data elements comprise a subset of the N data element tag identifier, and M<N. The receiver receives a message from a tag reader. The memory stores the N data element tag identifier and stores a definition of the M data elements.

BRIEF DESCRIPTION OF THE DRAWINGS

These and other features and advantages will become more apparent from a detailed consideration of the invention when taken in conjunction with the drawings in which:

FIG. 4 illustrates additional detail of a first reader that can be used with the tagging system of FIG. 1;

FIG. 5 illustrates a message format useful in supporting communications between the tag and the first reader of the tagging system shown in FIG. 1;

FIG. 6 illustrates an exemplary composition of a frame of the message format shown in FIG. 5;

FIG. 7 illustrates an exemplary composition of the header of the frame shown in FIG. 6;

FIG. 8 illustrates an exemplary composition of a time slot of the frame shown in FIG. 6;

FIG. 9 illustrates an exemplary composition of the header of the time slot shown in FIG. 8;

DETAILED DESCRIPTION

Figure 1:
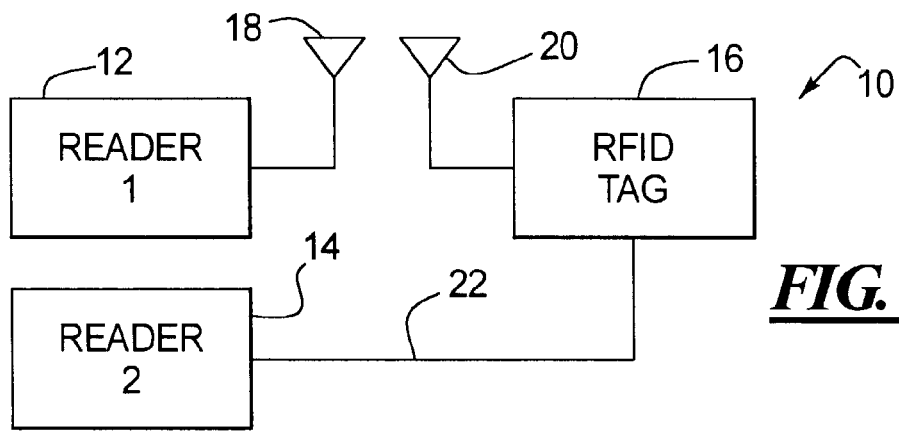
FIG. 1 illustrates a tagging system in accordance with one embodiment of the present invention.

As illustrated in FIG. 1, a tagging system 10 includes a first reader 12, a second reader 14, and an RFID tag 16. The first reader 12, for example, may be a long range reader capable of reading data from the RFID tag from a substantial distance such as several hundred feet or more and may have an expected range of approximately 500 feet. The second reader 14, for example, may be a short range reader limited to reading data from the RFID tag 16 from only a short distance such as less than two feet, and may be expected, in typical usage, to have a range of between six inches and eighteen inches.

The first reader 12 includes an antenna 18, and the RFID tag 16 similarly includes an antenna 20. The antennas 18 and 20 establish an RF link between the first reader 12 and the RFID tag 16 so that the first reader 12 can remotely read the identification code (or other type of identifier) stored in a memory of the RFID tag 16.

A secure link 22 between the second reader 14 and the RFID tag 16 permits the second reader 14 to read information from the RFID tag 16 in a more secure manner. For example, it may not be desirable for the first reader 12 to read certain information stored in the RFID tag 16 because long range RF communications can be intercepted by a strategically placed surreptitious reader similar to the first reader 12. Accordingly, the secure link 22 increases the difficulty in illicitly acquiring the more sensitive information that may be stored on the RFID tag 16.

The secure link 22 is shown in FIG. 1 as a hard wire link between the second reader 14 and the RFID tag 16. Accordingly, the more sensitive information stored on the RFID tag 16 can be read by establishing a physical interconnection between the second reader 14 and the RFID tag 16.

Alternatively, the secure link 22 may be a limited range magnetic link such as those provided by contact-free smart cards. As a still further alternative, the secure link 22 may be a very limited range RF link. Other alternatives will occur to those skilled in the art. One advantage of using one of these non-hardwired alternatives for the secure link 22 is that then the RFID tag 16 can be more readily used as a security device. Accordingly, when an attempt is made to remove an article to which the RFID tag 16 is attached, the second reader 14 located at a portal of a secured area or otherwise can pick up a signal from the RFID tag 16 indicating that an attempt is being made to remove the article from the secured area.

Figure 2:
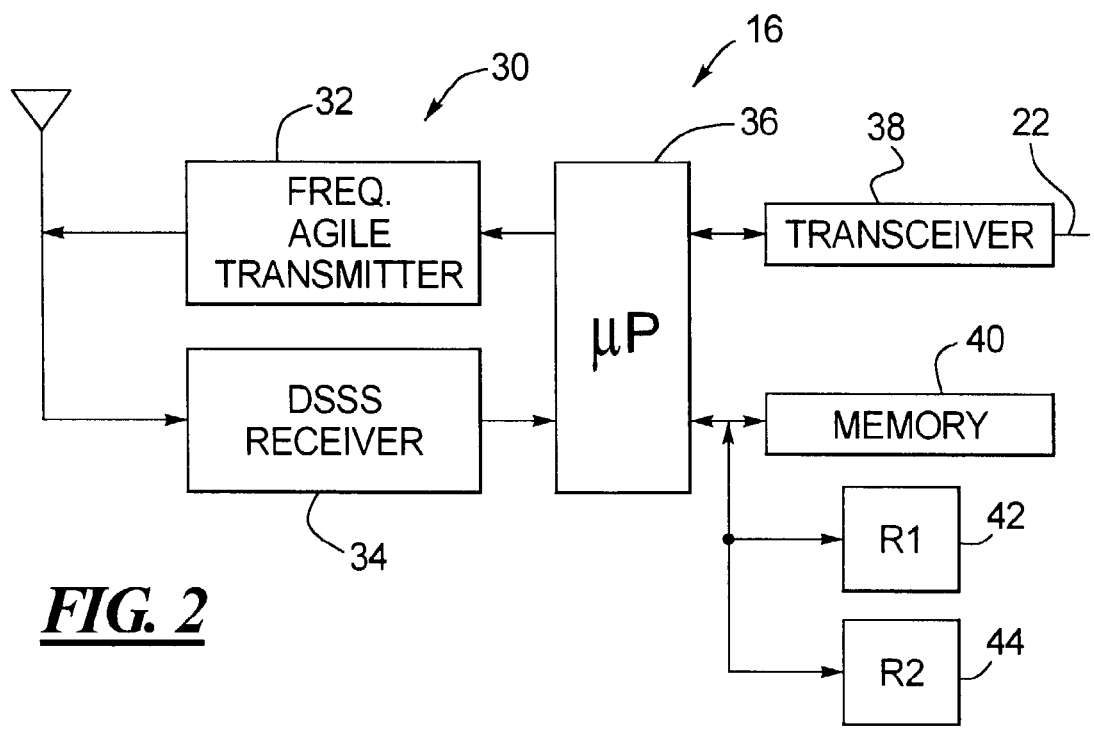
FIG. 2 illustrates additional detail of a tag that can be used with the tagging system of FIG. 1.

An embodiment of the RFID tag 16 is shown in additional detail in FIG. 2. The RFID tag 16 includes a first transceiver 30 comprising a frequency agile (frequency hopping) RF transmitter 32 and a direct sequence spread spectrum RF receiver 34. The frequency agile RF transmitter 32 and the direct sequence spread spectrum RF receiver 34 are coupled between the antenna 20 and a microprocessor 36. Accordingly, the frequency agile RF transmitter 32 of the RFID tag 16 implements frequency hopping in transmitting information to the first reader 12, and the direct sequence spread spectrum RF receiver 34 of the RFID tag 16 implements direct sequence spread spectrum synchronization and decoding in receiving communications from the first reader 12.

The RFID tag 16 also includes a second transceiver 38 between the microprocessor 36 and the second reader 14. Accordingly, the RFID tag 16 can transmit and/or receive communications to and/or from the second reader 14. In the case where the secure link 22 is a hardwire link, the second transceiver 38 may simply be a plug that is connectible to a corresponding plug of the second reader 14. In the case where the secure link 22 is an RF link, the second transceiver 38 may be an RF transceiver of any known type provided that this RF transceiver preferably has a much shorter range than the frequency agile RF transmitter 32 and the direct sequence spread spectrum RF receiver 34. In the case where the secure link 22 is a magnetic link, the second transceiver may simply be a magnetic emitter (and/or sensor) capable of magnetically interfacing with the second reader 14.

The RFID tag 16 further comprises a memory 40 coupled to the microprocessor 36. The memory 40 stores the unique identification code ID of the RFID tag 16 that can be read by the first reader 12 through the antennas 18 and 20, the frequency agile RF transmitter 32, the direct sequence spread spectrum RF receiver 34, and the microprocessor 36. The memory 40 may also store information supplied to it by the second reader 14 through the secure link 22, the second transceiver 38, and the microprocessor 36. The memory 40 can additionally store information supplied by the first reader 12.

The information stored in the memory 40 can include, for example, the inventory history of the article to which the RFID tag 16 is attached. Accordingly, the date that the article entered inventory, the date that the article left inventory, the length of time that the article has been in inventory, any movement within inventory, and similar information may be stored in the memory 40.

The information stored in the memory 40 may also include shipping manifests that indicate when and to whom the article is to be shipped. Moreover, in the case where individual articles with differing destinations are shipped in the same container, an RFID tag attached to the container, hereafter called a container tag, can be attached to the container. This container tag may be arranged to store the identity and destination of each article in the container. As articles are removed from the container, the information stored in the container tag can be updated to indicate which articles have been removed, the location at which the articles were removed, and the identity of the personnel who removed the articles.

The information stored in the memory 40 may further include maintenance, repair, and date of service records showing the maintenance and/or repair history of the corresponding article.

Other information related to the article may likewise be stored in the memory 40. For example, the integrity of the information stored in the memory 40 can be assured by keeping a record of the modifications to the stored information and of the identity of the personnel making the modifications. As another example, records related to the production of the article may be stored in the memory of the tag.

Accordingly, any information about the article may be stored with the article instead of in a remote computer system or on paper.

Because the records are carried by the RFID tag 16 attached to a corresponding article, the RFID tag 16 eliminates the need to maintain paper or computer records of the life history of an article, the RFID tag 16 eliminates the problem of lost or misplaced records, and the RFID tag 16 improves operational efficiency by eliminating the requirement to retrieve records prior to accessing and/or operating on the article.

Figure 3:
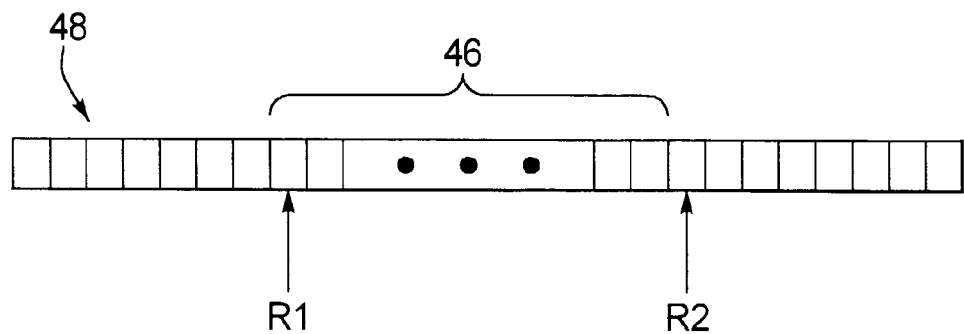
FIG. 3 illustrates an exemplary identification code of the tag shown in FIG. 2.

The RFID tag 16 further includes first and second registers 42 and 44. The first register 42 stores a start position R1 and the second register 44 stores an end position R2 that together define a limited range 46 of an identification code 48 that is stored in the memory 40 and that uniquely identifies the RFID tag 16. FIG. 3 shows an exemplary identification code that can be used for the identification code 48.

As shown in FIG. 3, the identification code 48 is constructed of a plurality of data elements, such as bits. R1 designates the start position and R2 designates the end position of the limited range 46 within the identification code 48. The start position R1 is stored in the first register 42, and the end position R2 is stored in the first register 42.

The start and end positions R1 and R2 to define the limited range 46 within the identification code 48 are advantageous because they allow the first reader 12 to identify the RFID tag 16 from the data elements within the limited range 46 instead of from all of the data elements in the full identification code 48. Accordingly, transmission time from the RFID tag 16 to the first reader 12 and/or processing power expended by the first reader 12 can be saved because fewer identification code data elements are used to correctly identify the RFID tag 16.

This advantage is based on the assumption that there will be a limited number of tags of interest to the first reader 12 such that not all of the data elements in the identification code 48 are required for the first reader 12 to be able to distinguish these tags from one another. Thus, even though fewer than all of the data elements of the identification code 48 are used to identify the tags, no two tags of interest to the first reader 12 will have the same identification. This assumption is valid in many applications.

Accordingly, each tag that is included in the tagging system 10 is assigned a corresponding one of a set of sequential identification codes. This set of sequential identification codes is delimited by the start and end positions R1 and R2. The start position R1 is stored in the first register 42, and the end position R2 is stored in the second register 44. When the first reader 12 interrogates these tags for their identification codes, these tags need to transmit back to the first reader 12 only the data elements within the limited range 46 defined by the start position R1 and the end position R2. Accordingly, the first reader 12, rather than processing all of the data elements of the identification code 48 for each tag, needs to process only the data elements in the limited range 46 defined by the start position R1 and the end position R2 in order to uniquely identify the tags of the tagging system 10. Thus, substantial processing power and transmission time are saved. Because the only tags within the transmission and reception range of the first reader 12 are the tags that are uniquely identified by the data elements within the limited range 46 defined by the start and end positions R1 and R2, the first reader 12 does not receive the same identification code from two or more different tags.

The start and end positions R1 and R2 may be loaded into each tag at installation from the second reader 14 over the secure link 22. In this case, the start and end positions R1 and R2 are loaded into the tags one tag at a time.

Alternatively, the start and end positions R1 and R2 may be manually loaded into the first reader 12, and the start and end positions R1 and R2 may be then transmitted from the first reader 12. This alternative has the advantage that the start and end positions R1 and R2 can be loaded into all tags based upon a single transmission from the first reader 12. However, this alternative has the disadvantage that the first reader 12 does not adapt to changing numbers of tags in the tagging system 10.

As a further alternative, the first reader 12 can interrogate all tags with its transmission and reception range to identify themselves. Each of the tags responds with its entire identification code requiring the first reader 12 to process all data elements in all of the identification codes stored by the tags and returned to the first reader 12. The first reader 12 then sorts through all returned identification codes in order to determine the smallest range of data element positions that results in a unique identification of each of the tags. The first reader then transmits the start and end positions of this range as R1 and R2. Each tag receives these start and end positions R1 and R2 and stores them in the respective first and second registers 42 and 44. This alternative has the advantage that the first reader 12 can adaptively adjust the start and end positions R1 and R2 as the limited range 46 changes due to tags being added to or dropped from the tagging system 10.

Regardless of the method used to get the start and end positions R1 and R2 to the RFID tag 16, the RFID tag stores the start position R1 in the first register 42 and stores the end position R2 in the second register 44.

The RFID tag 16 may include a battery (not shown) that is coupled so that it supplies power to the frequency agile RF transmitter 32, to the direct sequence spread spectrum RF receiver 34, to the microprocessor 36, to the second transceiver 38 (if necessary), and to the memory 40 (also if necessary).

Moreover, a plurality of sensors (not shown) may be coupled to the microprocessor 36. These sensors may include, for example, a temperature sensor, a humidity sensor, and other sensors such as a pressure sensor, a proximity sensor, an electromagnetic sensor, an optical sensor, a mechanical sensor, a chemical sensor, and/or the like. The microprocessor 36 stores the information from the sensors in the memory 40, and this information may be read from the memory 40 by the second reader 14 or by the first reader 12.

The microprocessor 36 may be arranged to further sense the voltage level of the battery. Accordingly, the microprocessor 36 stores this voltage level in the memory 40, and this stored voltage level may be read from the memory 40 by the second reader 14 or by the first reader 12. Thus, if the voltage level of the battery as read by either the second reader 14 or the first reader 12 indicates that the battery needs charging or replacement, suitable remedial action may be taken.

Because of the frequency agile RF transmitter 32 and the direct sequence spread spectrum RF receiver 34, the RFID tag 16 is capable of relatively long range activation while providing a low power method for command-response activation by the first reader 12. This long range activation allows the RFID tag 16 to be placed at distances remote from the first reader 12 for purposes of interrogating the RFID tag 16 for its unique tag number and possibly other information.

The frequency agile RF transmitter 32 and the direct sequence spread spectrum RF receiver 34 allow the tagging system 10 to operate in the FCC defined Industrial Scientific and Medical (ISM) bands at maximum legal power. Both frequency hopping as used by the frequency agile RF transmitter 32 and direct sequence spread spectrum communications as used by the direct sequence spread spectrum RF receiver 34 circumvent jamming by narrow-band signals using different methods of spreading the signal over a large bandwidth. The direct sequence spread spectrum RF receiver 34 can receive signals from the first reader 12 within milliseconds of activation. By contrast, a frequency agile receiver must search a long frequency hopping sequence in order to receive signals from the first reader 12. The time required to make this search is typically longer than the time required to detect a direct spread spectrum sequence because the direct spread spectrum signal is either on a fixed frequency or on one of only a few frequencies.

An embodiment of the first reader 12 is shown in additional detail in FIG. 4. The first reader 12 includes a direct sequence spread spectrum RF transmitter 50 and a frequency agile RF receiver 52 coupled between the antenna 18 and a microprocessor 54. The frequency agile RF receiver 52 of the first reader 12 implements frequency hopping in receiving information from the frequency agile RF transmitter 32 of the RFID tag 16. Moreover, the direct sequence spread spectrum transmitter 50 of the first reader 12 implements direct sequence spread spectrum transmission in transmitting communications to the direct sequence spread spectrum RF receiver 34 of the RFID tag 16.

The first reader 12 further comprises a memory 56 coupled to the microprocessor 54. The memory 56 stores the information that the first reader 12 receives from the RFID tag 16. The memory 56 also stores the software that supports a communication protocol as described herein.

This communication protocol governs the message format that is used between the first reader 12 and the RFID tag 16. According to this protocol, a message is comprised of a plurality of frames as shown in FIG. 5. Each frame is preferably no longer than the length of time the frequency agile RF transmitter 32 is allowed to dwell at any given frequency.

Each of the frames shown in FIG. 5 has the construction shown in FIG. 6. Accordingly, each frame has a frame header and a number of time slots TS0-TSN. The frame header contains information about the first reader 12 that is reading the RFID tag 16. As shown in FIG. 7, the header contains (i) the state of the first reader 12, (ii) the hop sequence currently being used by the first reader 12 to receive messages from the RFID tag 16, and (iii) the current position (i.e., frequency) of the first reader 12 in this hop sequence. The frame header can also contain such other information as may be useful in the tagging system 10. For example, the frame header may also contain the number (N+1) of the time slots in the corresponding frame.

The first reader 12 may have several reader states including, for example, an active communication state and a beacon state. In the active communication state, the first reader 12 commands responses from one or more selected tags such as the RFID tag 16. In the beacon state, the tags, such as the RFID tag 16, self-initiate the transmission of messages to the first reader 12.

The hop sequence and/or the current position in the hop sequence as contained in the frame header are/is useful to tags that have limited signal processing capability. Such tags, for example, may have no capability themselves to determine the frequency (i.e., the current position in the hop sequence) onto which they should transmit their responses.

Moreover, each time slot may also include a time slot header and data as shown in FIG. 8, and each time slot header, as shown in FIG. 9, may contain the hop sequence and the current position in the hop sequence of the first reader 12. The time slot header may also contain the relative position, such as a time slot number (0, 1, . . . , or N), of the corresponding time slot in the frame. This relative position information may be used by the RFID tag 16 to establish a relative timing interval into which the RFID tag 16 can transmit data. By transmitting the hop sequence and the current position in the hop sequence at the beginning of each time slot, the RFID tag 16 is aided in its rapid acquisition of the current hop sequence and frequency. Because the RFID tag 16 can acquire, from the header in each time slot, sufficient information about the frequency and timing of the first reader 12, the RFID tag 16 may power down until such time that it expects the complete header information to be transmitted by the first reader 12. Therefore, the RFID tag 16 is able to substantially reduce the amount of power that it uses to determine the frequency and timing to be used by its frequency agile RF transmitter 32 in transmitting information in the data portion of the time slot.

As indicated above, the first reader 12 transmits all headers, whether frame headers or time slot headers. The RFID tag 16 transmits only in the data portion of the time slots. The RFID tag 16 may implement a non-deterministic method of selecting a time slot for the transmission of data. By using a non-deterministic method of selecting a time slot, the possibility of a plurality of tags transmitting data into the same time slot is minimized. For purposes of illustration, such a non-deterministic method of selecting a time slot could be embodied by a pseudo-random number generator that pseudo-randomly generates a number of a time slot into which its corresponding tag transmits its data. This implementation results in a communications protocol similar to, but not identical to, the Aloha protocol, a standard communications protocol.

Alternatively, the RFID tag 16 may transmit in a time slot determined by the data elements in the limited range 46 within the identification code 48 stored in the memory 40. For example, if there are more tags than there are time slots in a single frame, the more significant data elements in the limited range 46 of the identification code 48 assigned to the RFID tag 16 may be used to designate a frame and the less significant data elements in the limited range 46 of the identification code 48 assigned to the RFID tag 16 may be used to designate a time slot in the frame designated by the more significant data elements.

Accordingly, the tags of the tagging system 10 should transmit their information to the first reader 12 in a way than minimizes the likelihood of contention. If more than one tag should transmit in the same time slot, the first reader 12 can command the non-contending tags to be silent and can adjust the values of the start position R1 and the end position R2 so that only the contending tags (or a reduced number of tags that includes the contending tags) will respond to the next interrogation from the first reader 12.

The first reader 12 can communicate directly with a specific tag or a group of specific tags. When the first reader 12 is communicating directly with a specific tag or a group of specific tags, the first reader 12 may suspend the transmission of time slot headers. This suspension indicates to all other tags that their communications are to be suspended. Also, all data may be transmitted between the first reader 12 and the RFID tag 16 in packets having packet numbers so that both the first reader 12 and the RFID tag 16 can detect missing or duplicate data. Moreover, acknowledgements can be used to signify a successful transmission between the first reader 12 and the RFID tag 16. A failure to receive an acknowledgement can cause re-transmission of the information. Once a transaction between the first reader 12 and a specific tag or group of tags is complete, the first reader 12 resumes transmitting the headers.

Figure 10:
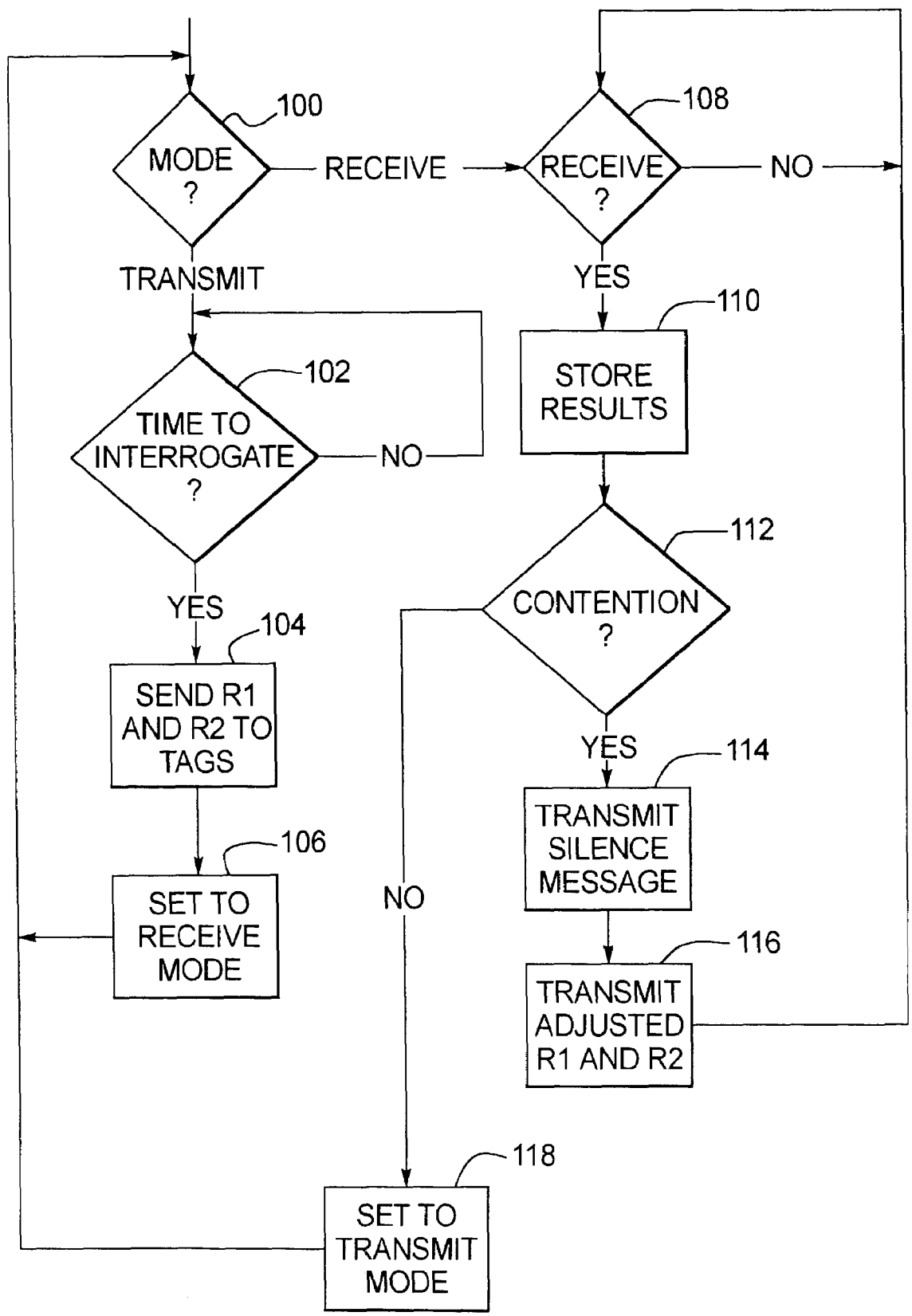
FIG. 10 is a flow chart showing an exemplary operation of the first reader of FIGS. 1 and 4; and, FIG. 11 is a flow chart showing an exemplary operation of the tag illustrated in FIGS. 1 and 2.

As shown in FIG. 10, when the first reader 12 is in the transmit mode (block 100), and when the first reader determines that it is time to begin an interrogation cycle (block 102), the first reader 12 transmits (block 104) the start and end positions R1 and R2 to the tags of the tagging system 10. In transmitting the start and end positions R1 and R2 to the tags of the tagging system 10, the first reader 12 can address and transmit to the tags individually, the first reader 12 can address and transmit to the tags as a group, or the first reader 12 can use a combination of individual and group addressing and transmission. Also, when the first reader 12 transmits the start and end positions R1 and R2 to the tags of the tagging system 10, it can do so by inserting the start and end positions R1 and R2 into the interrogation message that starts an interrogation cycle, or it can transmit the start and end positions R1 and R2 to the tags prior to the transmission of the interrogation message that starts an interrogation cycle. Following transmission of the start and end positions R1 and R2 and/or the interrogation message, the first reader 12 sets itself to the receive mode (block 106).

When the first reader 12 is in the receive mode (block 100), it waits to receive a message from the RFID tag 16 (block 108). When the first reader 12 receives a message, it stores the received information (block 110). If the first reader 12 determines that contention occurred between the two or more tags (block 112), the first reader 12 transmits a silence message to all tags not involved in the contention (block 114) and transmits adjusted start and end positions R1 and R2 (block 116) as described above. The first reader 12 then waits to receive messages from the contending tags. When all messages have been received without contention, the first reader 12 sets itself to the transmit mode (block 118).

Figure 11:
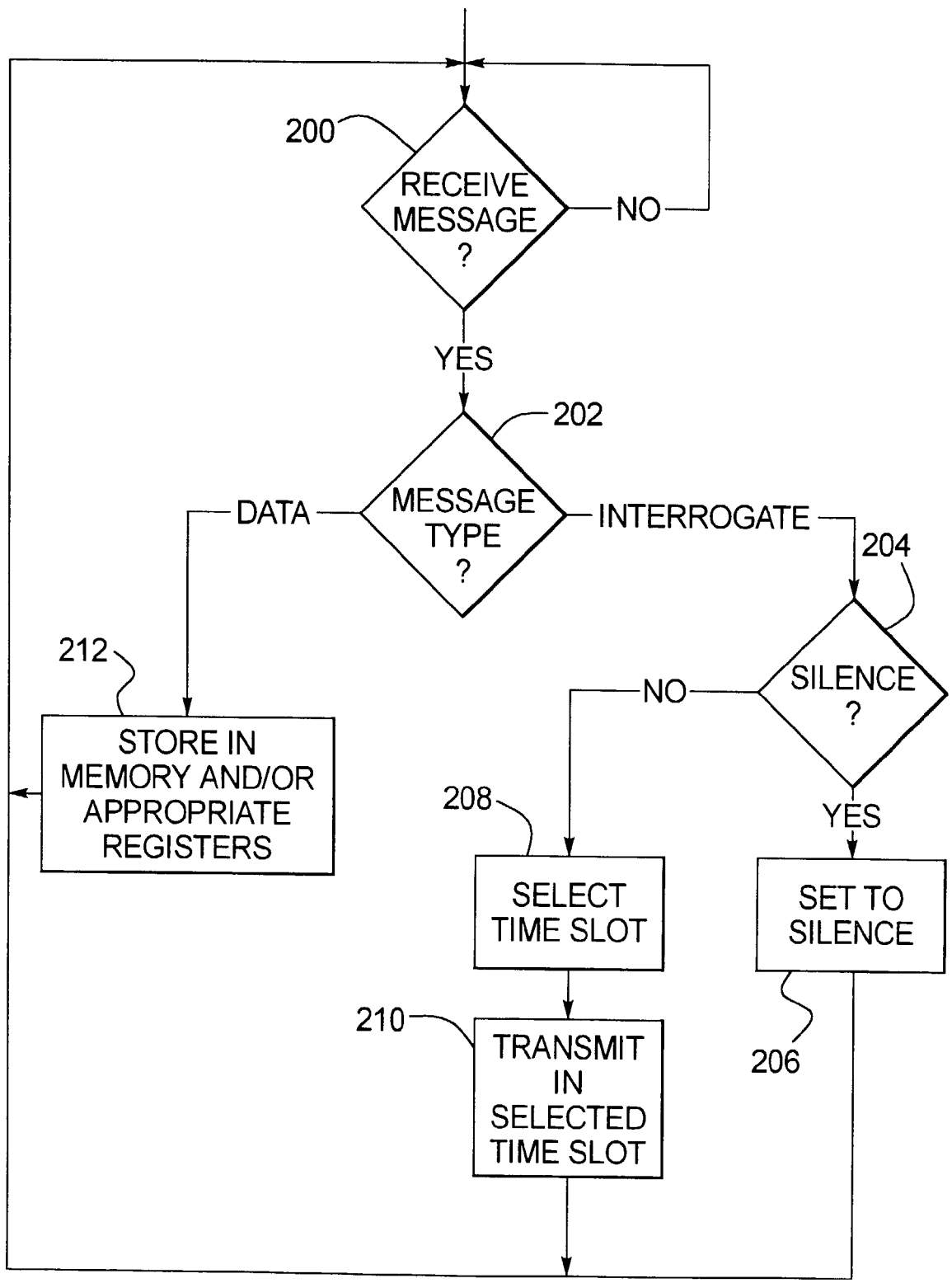

As shown in FIG. 11, when the RFID tag 16 receives a message (block 200) and the message is an interrogation message (block 202), the RFID tag 16 determines whether it had been instructed to silence (204). As discussed above, the RFID tag 16 may be instructed to silence, for example, when the first reader 12 is in the process of resolving contention between other tags. If the RFID tag 16 had been instructed to silence, the RFID tag 16 sets itself (block 206) so that it does not respond to the interrogation message. On the other hand, if the RFID tag 16 had not been instructed to silence, the RFID tag 16 selects a time slot within which to transmit (block 208) and transmits the portion of its identification code 48 within the limited range 46 defined by the start and end positions R1 and R2 received from the first reader 12 (block 210). In selecting the time slot, the RFID tag 16 may use any of the time slot selection approaches discussed above or any other approach consistent with the present invention.

When the RFID tag 16 receives a message (block 200) and the message is a data message, the RFID tag 16 stores the data as appropriate (block 212). For example, if the data includes the start and end positions R1 and R2, the RFID tag 16 stores the start and end positions R1 and R2 in the corresponding first and second registers 42 and 44. On the other hand, if the data includes a silence instruction, the RFID tag 16 may set a silence flag TRUE to indicate that the test at the block 204 should return a YES answer. Alternatively, the received message may contain data other than the start and end positions R1 and R2 or the silence instruction, in which case the data may be stored in the memory 40 or otherwise appropriately processed.

Certain modifications of the present invention have been disclosed above. Other modifications will occur to those practicing in the art of the present invention. For example, as described above, separate messages may be used by the first reader 12 to transmit the start and end positions R1 and R2 and to transmit the interrogation instruction. Instead, the first reader 12 may transmit the start and end positions R1 and R2 and the interrogation instruction in the same message.

Also, as described above, the first reader 12 transmits the start and end positions R1 and R2, the interrogation instruction, and the silence message to the RFID tag 16. However, the first reader 12 can also be arranged to transmit other information to the RFID tag 16.

Additionally, as described above, the first reader 12 is arranged to read the tag identification code of the RFID tag 16, and the second reader 14 is arranged to read other information from the RFID tag 16. However, the first reader 12 may be arranged instead to read any combination of tag identification code and other information from the RFID tag 16, and the second reader 14 may be similarly arranged to read any combination of the tag identification code and other information from the RFID tag 16.

Moreover, although the RFID tag 16 is shown as a microprocessor based tag in FIG. 2, the RFID tag 16 may instead comprise one or more digital circuit elements, and/or one or more programmable logic arrays, and/or one or more dedicated integrated circuits, etc.

Furthermore, the first reader 12 as described above has a range of several hundred feet and could have an expected range of approximately 500 feet. However, this range could be longer or shorter depending on the application and/or other factors. Similarly, the range given above for the second reader 14 could be other than as described above.

Also, the transmitter of the first transceiver 30 of the RFID tag 16 is described above as the frequency agile RF transmitter 32, and the receiver of the first transceiver 30 of the RFID tag 16 is described above as the direct sequence spread spectrum RF receiver 34. However, the RFID tag 16 may instead advantageously use other types of transmitters and receivers.

Additionally, the tagging system 10 includes both first and second readers 12 and 14. Instead, the tagging system 10 may include only one of the first and second readers or more than two readers. Similarly, the RFID tag 16 need only include one of the first and second transceivers 30 and 38 in the case where the tagging system relies on only one of the first and second readers 12 and 14, or the RFID tag 16 need only include more than two transceivers in the case where the tagging system relies more than two readers.

Moreover, as described above, the identification code that uniquely identifies the RFID tag 16 is stored in the memory 40. Instead, the identification code may be stored in a register similar to the first and second registers 42 and 44. Similarly, the beginning and end positions of the identification code that are stored in the first and second registers 42 and 44 may instead be stored in the memory 40.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A method of communicating an identifier from an RFID tag to a tag reader, wherein the identifier includes N data elements, and wherein the method comprises:
    selecting M data elements of the identifier based on a start position R1 and an end position R2 defining a limiting range within the identifier, wherein M<N; and,
    transmitting only the selected M data elements from the RFID tag to the tag reader so as to identify the RFID tag to the tag reader.

2. The method of claim 1 wherein the selected M data elements are sequential data elements of the identifier.

3. The method of claim 1 further comprising storing the start position R1 and the end position R2 in a memory of the RFID tag.

4. The method of claim 3 wherein the memory comprises at least one register.

5. The method of claim 3 wherein the memory comprises first and second registers, wherein the storing of the start position R1 and end position R2 comprises storing the start position R1 in the first register, and wherein the storing of the start position R1 and the end position R2 comprises storing the end position R2 in the second register.

6. The method of claim 1 further comprising receiving the start position R1 and the end position R2 from the tag reader and storing the start position R1 and the end position R2 in a memory of the RFID tag.

7. The method of claim 1 further comprising receiving the start position R1 and the end position R2 from the tag reader and storing the start position R1 and the end position R2 in corresponding registers of the RFID tag.

8. The method of claim 1 wherein the transmitting of only the selected M data elements from the RFID tag to the tag reader comprises:
    determining a time slot based on the selected M data elements; and,
    transmitting the selected M data elements from the RFID tag to the tag reader in the time slot.

9. The method of claim 8 wherein the selecting of M data elements of the identifier comprises:
    receiving a start position R1 and an end position R2 from the tag reader;
    selecting the M data elements of the identifier based on the received start position R1 and the received end position R2 defining a limiting range within the identifier; and,
    wherein the transmitting of only the selected M data elements from the RFID tag to the tag reader comprises:
    transmitting only the data elements within the limited range.

10. The method of claim 1 further comprising:
    receiving a silence message from the tag reader; and,
    suppressing the transmitting of the selected M data elements from the RFID tag to the tag reader in response to the silence message.

11. The method of claim 10 wherein the selecting of M data elements of the identifier comprises:
    receiving a start position R1 and an end position R2 from the tag reader;
    selecting the M data elements of the identifier based on the received start position R1 and the received end position R2 defining a limiting range within the identifier; and,
    wherein the transmitting of only the selected M data elements from the RFID tag to the tag reader comprises:
    transmitting only the data elements within the limited range.

12. The method of claim 10 wherein the transmitting of only the selected M data elements from the RFID tag to the tag reader comprises:
    determining a time slot based on the selected M data elements; and,
    transmitting the selected M data elements from the RFID tag to the tag reader in the time slot.

13. The method of claim 12 wherein the selecting of M data elements of the identifier comprises:
    receiving a start position R1 and an end position R2 from the tag reader;
    selecting the M data elements of the identifier based on the received start position R1 and the received end position R2 defining a limiting range within the identifier; and,
    wherein the transmitting of only the selected M data elements from the RFID tag to the tag reader comprises:
    transmitting only the data elements within the limited range.

14. A method of identifying an RFID tag comprising:
    transmitting a signal from a tag reader to the RFID tag, wherein the RFID tag includes an identifier comprising N data elements;
    transmitting a start position R1 and an end position R2 from the tag reader to the RFID tag, wherein the start position R1 and the end position R2 define M data elements to be transmitted by the RFID tag to the tag reader;
    receiving only M of the N data elements from the RFID tag, wherein M<N; and,
    identifying the RFID tag from only the M data elements.

15. The method of claim 14 wherein the signal that identifies the M data elements to be transmitted by the RFID tag to the tag reader comprises an interrogation signal.

16. The method of claim 14 further comprising:
    detecting contention between the RFID tag and at least one other RFID tag;
    transmitting a signal that identifies K data elements, wherein the K data elements comprises a subset of the M data elements, and wherein K<M<N;
    receiving only the K data elements of the M data elements of the N data elements from the RFID tag; and,
    identifying the RFID tag from only the K data elements.

17. The method of claim 16 wherein the transmitting of a signal that identifies the K data elements to be transmitted by the RFID tag to the tag reader comprises transmitting a revised start position R1 and a revised end position R2 from the tag reader to the RFID tag, and wherein the revised start position R1 and the revised end position R2 define the K data elements.

18. The method of claim 17 wherein the signal that identifies the K data elements to be transmitted by the RFID tag to the tag reader comprises an interrogation signal.

19. The method of claim 14 wherein the transmitting of a signal from a tag reader to the RFID tag comprises:

determining the value of M based upon responses from the RFID tag and from other RFID tags; and, transmitting a signal that identifies the M data elements to be transmitted by the RFID tag to the tag reader.

20. The method of claim 19 wherein the signal that identifies the M data elements to be transmitted by the RFID tag to the tag reader comprises an interrogation signal.

21. The method of claim 19 wherein the transmitting of a signal that identifies the M data elements to be transmitted by the RFID tag to the tag reader comprises transmitting a start position R1 and an end position R2 from the tag reader to the RFID tag, and wherein the start position R1 and the end position R2 define the M data elements.

22. The method of claim 21 wherein the signal that identifies the M data elements to be transmitted by the RFID tag to the tag reader comprises an interrogation signal.

23. The method of claim 19 further comprising:
detecting contention between the RFID tag and at least one other RFID tag;
transmitting a signal that identifies K data elements, wherein the K data elements comprises a subset of the M data elements, and wherein K<M<N;
receiving only the K data elements of the M data elements of the N data elements from the RFID tag; and,
identifying the RFID tag from only the K data elements.

24. The method of claim 23 wherein the transmitting of a signal that identifies the K data elements to be transmitted by the RFID tag to the tag reader comprises transmitting a revised start position R1 and a revised end position R2 from the tag reader to the RFID tag, and wherein the revised start position R1 and the revised end position R2 define the K data elements.

25. The method of claim 24 wherein the signal that identifies the K data elements to be transmitted by the RFID tag to the tag reader comprises an interrogation signal.

26. An RFID tag uniquely identified by an N data element tag identifier comprising:
a transmitter arranged to transmit M data elements so as to identify the RFID tag, wherein the M data elements comprises a subset of the N data element tag identifier, and wherein M<N;
a receiver arranged to receive a message from a tag reader; and,
a memory storing the N data element tag identifier and storing a definition of the M data elements, wherein the definition comprises a start data element position R1 and an end data element position R2, wherein the start data element position R1 defines a start data element location within the N data element tag identifier, and wherein the end data element position R2 defines an end data element location within the N data element tag identifier.

27. The RFID tag of claim 26 wherein the receiver comprises a direct sequence spread spectrum RF receiver.

28. The RFID tag of claim 26 wherein the transmitter comprises a frequency agile RF transmitter.

29. The RFID tag of claim 26 wherein the receiver comprises a direct sequence spread spectrum RF receiver, and wherein the transmitter comprises a frequency agile RF transmitter.

30. The RFID tag of claim 26 wherein the memory comprises at least one register storing the definition of the M data elements.

31. The RFID tag of claim 26 wherein a first register stores the start data element position R1, and wherein a second register stores the end data element position R2.

32. The RFID tag of claim 26 wherein the M data elements comprise M sequential data elements of the N data element tag identifier.

* * * * *